F. L. WATEROUS, DEC'D.
J., C. P. & F. J. WATEROUS, EXECUTORS.
CLUTCH MECHANISM.
APPLICATION FILED AUG. 26, 1912.

1,106,605.

Patented Aug. 11, 1914.
2 SHEETS—SHEET 1.

WITNESSES
H. E. Lambert
E. A. Paul

INVENTOR
FREDERICK L. WATEROUS
BY Paul & Paul
ATTORNEYS

F. L. WATEROUS, DEC'D.
J., C. P. & F. J. WATEROUS, EXECUTORS.
CLUTCH MECHANISM.
APPLICATION FILED AUG. 26, 1912.

1,106,605.

Patented Aug. 11, 1914.

2 SHEETS—SHEET 2.

WITNESSES
H. E. Lambert
E. A. Paul

INVENTOR
FREDERICK L. WATEROUS
BY Paul & Paul
ATTORNEYS

UNITED STATES PATENT OFFICE.

FREDERICK L. WATEROUS, OF ST. PAUL, MINNESOTA; JANE WATEROUS, CHARLES P. WATEROUS, AND FRANK J. WATEROUS EXECUTORS OF SAID FREDERICK L. WATEROUS, DECEASED.

CLUTCH MECHANISM.

1,106,605.  Specification of Letters Patent.  Patented Aug. 11, 1914.

Application filed August 26, 1912.  Serial No. 717,153.

*To all whom it may concern:*

Be it known that I, FREDERICK L. WATEROUS, of St. Paul, Ramsey county, Minnesota, have invented certain new and useful Improvements in Clutch Mechanisms, of which the following is a specification.

My invention relates to a clutch particularly well adapted for attachment to a jack shaft of a gasolene fire engine, but also capable of use with any motor driven vehicle or truck, whether a jack shaft is used or not.

The object of my invention is to provide a clutch device through which the jack shaft will drive both rear wheels of the engine or trucks ahead at uniform speed and at the same time such drive remaining positive until either rear wheel increases its speed to conform to varying curvatures of roadways.

A further object is to provide a clutch device which will automatically become inoperative when the rear wheels increase their speed, as on descending grades, beyond the speed of the engine, and will remain inoperative until such time as the speed of the rear wheel decreases sufficiently to conform to the engine speed.

A further object is to provide a retarding means for holding back the friction rollers of the clutch device when they are released from their operative position.

Other objects of the invention will appear from the following detailed description.

The invention consists generally in various constructions and combinations, all as hereinafter described and particularly pointed out in the claims.

Figure 1:
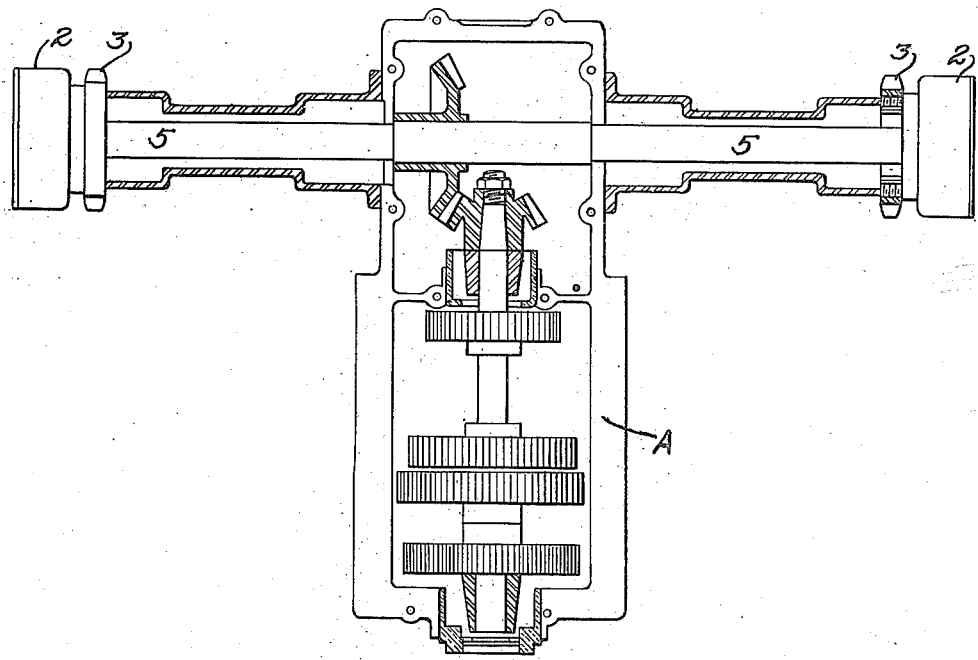
Figure 5:
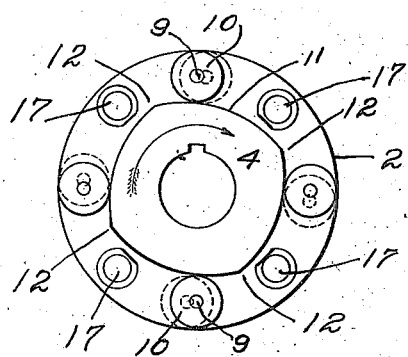
Figure 6:
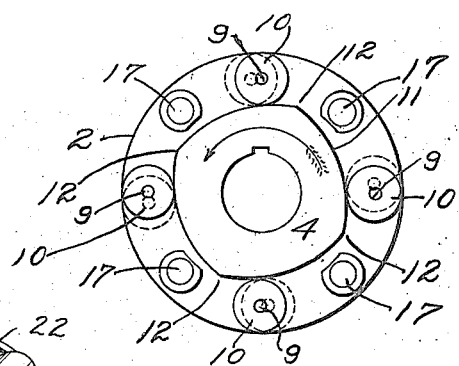
Figure 7:
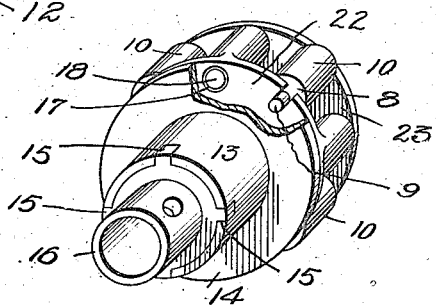
Figure 2:
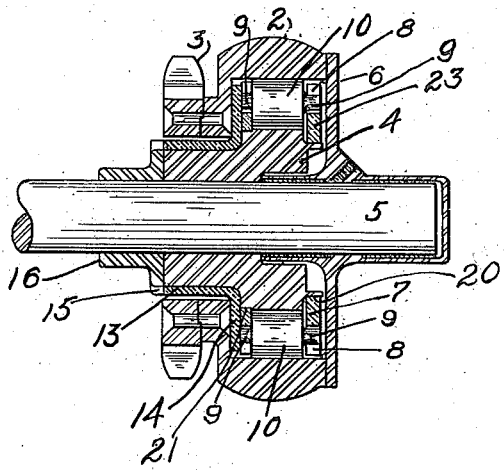
Figure 4:
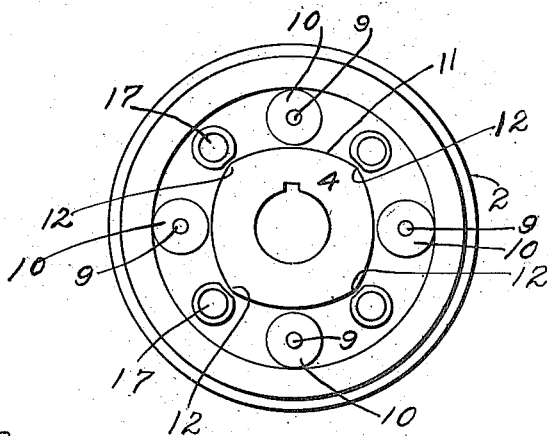
Figure 3:
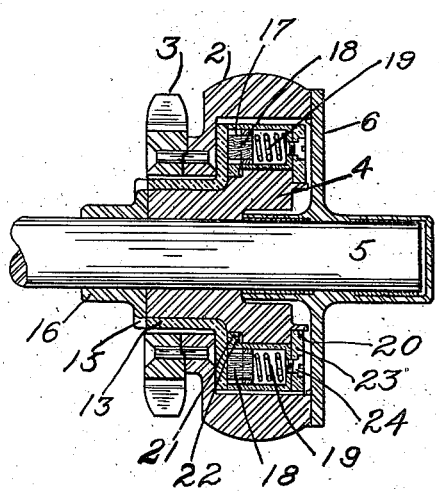

In the accompanying drawings forming part of this specification, Figure 1 is a sectional view illustrating the application of my invention to a jack shaft and showing the transmission mechanism between the engine shaft and the jack shaft, Fig. 2 is a detail sectional view, showing the manner of mounting the clutch or friction rollers and their position with respect to the operating cam, Fig. 3 is a similar view, illustrating the retarding plate and the spring pressed pins in contact therewith, Fig. 4 is a detail view illustrating the neutral position of the rollers, Fig. 5 is a similar view, illustrating the working position of the rollers when driving ahead, Fig. 6 indicates in full lines the position of the rollers when driving backward, and the dotted lines show the position of the rollers when coasting backward. Fig. 7 is a perspective view illustrating the manner of mounting the retarding device and its engagement with the stationary plate to check the movement of the carrier.

In the drawing, 2 represents an outer casing or housing on which a sprocket wheel 3 is rigidly secured.

4 is a cam keyed on a jack shaft 5 and 6 a cap or cover having a bearing on the jack shaft and secured by suitable means to the casing 2. The jack shaft is driven through a transmission mechanism "A" from an engine (not shown). This casing, the sprocket and the cap 6 are free to turn on the shaft except when locked by the mechanism hereinafter described.

7 represents a carrier loosely mounted on the cam and free to revolve thereon. This carrier is provided at intervals with a series of radial slots 8 in which studs 9 of friction rollers 10 are loosely mounted and adapted to slide radially in said slots when engaged by the cam. The periphery of the cam is preferably provided with a series of surfaces 11 corresponding in number to the number of rollers 10 and having a series of high points 12 between which and the inner surface of the casing 2 the rollers are gripped to temporarily lock the casing and sprocket on the shaft. I have shown four rollers and a corresponding number of surfaces on the cam, but I do not confine myself to this number as it may be varied according to the size of the cam and the work to be performed.

When the rollers are in the position shown in Fig. 4 with respect to the cam, they will be released from frictional contact therewith and the cam will run idle and the sprocket and casing remain stationary. To insure the rollers being in proper position to pick up the load, I prefer to provide a retarding device in connection with the roller carrier, which consists preferably of a sleeve 13 loosely fitted on the hub of the cam 4 and having an annular flange 14 at its inner end. The outer end of the sleeve has a notch 15 to interlock with a collar 16 that is secured to the housing (not shown) at the end of the cam hub whereby the sleeve 13 and the flange 14 will be stationary and may be designated as a "dead plate". The roller carrier is provided with a series of holes 17 therein in which friction plugs 18 of cork or other suitable material are mounted and adapted to contact with the inner face of the flange 14 and be held in yielding engagement therewith by springs. The retarding device will operate to check the movement of the loosely mounted carrier and rollers when the casing runs out of contact with the rollers, and will hold the rollers in proper position to be engaged by the high points of the cam and locked against the friction surface when the cam again overtakes the casing. Any suitable means may be provided for mounting the roller carrier on the cam but I prefer to provide annular grooves 20 and 21 on the cam on which an annular rib 22 on one side of the carrier and a plate 23 on the other side of the carrier are seated, said plate 23 being removable by means of screws 24 to allow the convenient mounting of the carrier on the cam and its removal therefrom.

As indicated in Fig. 1, I provide a clutch device at each end of the jack shaft and as this jack shaft extends from side to side of the machine, the sprockets, when locked with the casing on the shaft will operate at the same speed. Normally the friction rollers will be stationary by the frictional contact of the yielding plugs with the stationary plate and will remain so until the revolving cam moves sufficiently forward to wedge the rollers between the inner surface of the casing and the cam, causing the power of the engine to be transmitted to the rear wheels through the jack shaft, the cam and the sprocket casing. The differential mechanism remains a positive drive and the jack shaft locked to both sprockets will drive both rear wheels ahead at uniform speed and simultaneously. This will continue until such time as either rear wheel increases its speed to conform to varying curvatures of roadways. When the rear wheels increase their speed on descending grades or what is commonly known as coasting beyond the speed at which they are driven, the differential mechanism will become entirely inoperative until such time as the speed of the rear wheels decreases sufficiently to conform to the engine speed. The differential mechanism will operate in substantially the same way on reverse as when driven ahead. I prefer to make all the parts of steel and such parts as are subject to wear are case hardened.

The operation of the device is as follows:—The shaft or axle, as the case may be, will be positively driven and the casing having the internal friction surfaces will be loosely mounted and where a jack shaft is employed will have driving connections with the traction wheels, as by means of the sprocket wheels mounted on the casings and the chains connecting them with the wheels. The cams are rigidly secured on the shaft or axle, as shown, and will revolve continuously with the shaft or axle. The rollers mounted in the loose, rotating carrier between the cams and the internal friction surfaces of the casings will be out of contact with said friction surfaces when riding on the low points of the cams. As soon, however, as the cams are revolved, the rollers will be clamped or jammed between the high points of the cams and the friction surfaces of the casings thereby temporarily locking the casings on the shaft and causing the transmission of power from the shaft through the casings and driving connections to the wheels, thus making a positive drive. This will continue until the machine begins coasting or in making a turn the outer wheel travels a greater distance than the inner one. At such time the casing connected with the outer wheel will begin to revolve faster than the cam through which it is driven and its friction surface will move away from contact with the rollers, which will move forward slightly until their momentum is overcome by the retarding device and they will then be carried along by the revolving cam in an idle or inactive position until the slackening of the speed of the casing enables the cam to overtake it and again clamp the rollers against the friction surface and pick up the load. During the idle interval of the rollers the frictional retarding device will hold the roller carrier and retain the rollers in their proper position between the high points of the cam, so that when the cam overtakes the casing the rollers will be in proper position for clamping and resuming the driving operation. I therefore regard the frictional retarding device as an important feature of the invention. The operation on reverse will be substantially the same.

The invention may be applied to various kinds of motor driven vehicles and trucks, whether a jack shaft is used or not, and the details of construction and attachment may be modified in various ways and still be within the scope of my invention.

I claim as my invention:

1. The combination, with a shaft and a cam secured thereon, of a loosely mounted casing encircling said cam and having an internal friction surface, a carrier encircling said cam and free to rotate thereon, said carrier having a series of radial slots therein, clamping rollers having studs fitting within said slots and slidable radially therein with respect to the surface of said cam toward and from the friction surface of said casing, said rollers being clamped between the high points of said cam and said friction surface to drive said casing, and means for holding said carrier stationary when said rollers are released from their clamping position.

2. The combination, with a driving shaft and a cam secured thereon, of a loosely mounted casing encircling said cam and having an internal friction surface, said cam having annular grooves formed therein, a carrier encircling said cam and having a rib on one side to enter one of said grooves, a plate secured to the other side of said carrier and adapted to enter the other cam groove, said carrier being free to revolve on said cam, rollers having bearings in said carrier and radially movable therein toward and from the friction surface of said casing, said rollers being moved outwardly into engagement with said friction surface by contact of the high points of said cam with said rollers, and a retarding device arranged to check the movement of said carrier when said rollers are released from engagement with said friction surface.

3. A clutch device, comprising a continuously revolving cam having friction surfaces, a casing encircling said cam and having a friction surface, a loosely mounted carrier interposed between said cam and casing, radially moving rollers mounted in said carrier and operating to lock said cam and casing together, a stationary retarding plate disposed contiguous to said carrier and spring pressed plugs mounted in said carrier and engaging said stationary plate with a yielding pressure and operating to retard the rotation of said carrier and rollers.

4. The combination, with a shaft and a cam secured thereon, of a loosely mounted casing and sprocket wheel, a carrier loosely mounted on said cam and having a series of radial slots therein, friction rollers having bearings at each end in said slots and on both sides of said cam and held against lateral movement by the walls of said slots, said rollers being interposed between said cam and casing and being forced outwardly into engagement with said casing by the revolution of said cam.

5. The combination, with a shaft, and a cam secured thereon, of a carrier loosely encircling said cam and free to revolve thereon, a series of friction rollers mounted in said carrier and having a radial movement therein, yielding friction plugs mounted in said carrier, a stationary plate with which said plugs contact, a casing encircling said carrier and having an inner bearing surface between which and said cam said friction rollers are locked to drive said casing, and a sprocket wheel mounted on said casing.

6. The combination, with a driving member, and a cam secured thereon, of a driven member having an internal friction surface, rollers interposed between said cam and said friction surface and having a limited radial movement, a carrier for said rollers, said rollers being clamped between the high points of said cam and said friction surface to drive said driven member, said rollers becoming idle or inactive when the speed of said driven member exceeds that of said driving member, and a retarding device operating to check the movement of said rollers and carrier when released from engagement with said driven member, said retarding device including a stationary plate arranged adjacent to said carrier, and plugs mounted in said carrier and contacting with said plate and having springs for yieldingly holding them against said plate.

7. The combination, with a shaft and a cam keyed thereon, of a loosely mounted casing encircling said cam and having an internal friction surface, a sprocket wheel secured to said casing and movable freely therewith, a carrier encircling said cam, a series of rollers radially movable in said carrier and arranged to be clamped between the high points of said cam and said friction surface, said carrier being free to rotate on said cam, a sleeve loosely mounted on the hub of said cam and having an outwardly-projecting annular flange at its inner end adjacent to said carrier, and frictional retarding pins mounted in said carrier and contacting with said annular flange to check the movement of said carrier when said rollers are released from engagement with said friction surface.

8. A clutch device comprising a driving member having cam surfaces, a driven member, a carrier loosely mounted and encircling said driving member, clutch members mounted in said carrier between said cam surfaces and said driven member and actuated by said cam surface to lock said driven and driving members together, a stationary member, and retarding device mounted in said carrier and engaging said stationary member.

In witness whereof, I have hereunto set my hand this 13th day of August, 1912.

FREDERICK L. WATEROUS.

Witnesses:
W. HOLMES,
M. F. BAASEN.